3,359,262
2-[2-(5-NITROFURYL)-VINYL]-PYRIMIDINES
Hideji Takamatsu, Amagasaki-shi, Hyogo-ken, Shinsaku Minami, Nara-ken, Akio Fujita, Inokumadori, Kamikyo-ku, Kyoto, Katsuro Fujimoto, Neyagawa-shi, Osaka-fu, Masanao Shimizu, Suma-ku, Kobe-shi, Hyogo-ken, and Shinichi Nakamura, Suita-shi, Osaka-fu, Japan, assignors to Dainippon Pharmaceutical Co., Ltd., Osaka, Japan, a corporation of Japan
No Drawing. Filed May 20, 1963, Ser. No. 281,798
Claims priority, application Japan, Mar. 16, 1963, 38/14,518
7 Claims. (Cl. 260—240)

This invention relates to 2-[2-(5-nitrofuryl)-vinyl]-pyrimidines and processes for producing thereof.

According to the present invention, there are provided new 2-[2-(5-nitrofuryl)-vinyl]-pyrimidines of the following formula:

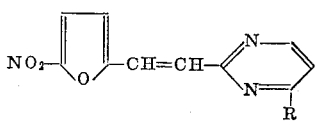

in which R is a member selected from the group consisting of hydrogen, hydroxyl, alkoxyls having 1 to 3 carbon atoms, amino, monoalkylaminos having 1 to 3 carbon atoms, dialkylaminos having 2 to 4 carbon atoms, acetylamino and propionylamino.

More particularly, the alkoxyls having 1 to 3 carbon atoms encompassed by R are methoxy, ethoxy, propoxy and isopropoxy. The monoalkylaminos having 1 to 3 carbon atoms encompassed by R are methylamino, ethylamino, propylamino and isopropylamino. The dialkylaminos having 2 to 4 carbon atoms encompassed by R are dimethylamino, methylethylamino, diethylamino, and methylpropylamino.

These new 2-[2-(5-nitrofuryl)-vinyl]-pyrimidines have high activities against important Gram positive and Gram negative strains of pathogenic bacteria, such as *Micrococcus pyogenes* var. *aureus*, *Escherichia coli*, *Shigella flexneri* and *Salmonella enteritidis*. Further, these compounds have antimycotic and antitrichomonal activities. It can be expected that these compounds are useful in the treatment of bacterial, fungal and protozoal infections in man and domestic animals.

The new 2-[2-(5-nitrofuryl)-vinyl]-pyrimidines can be prepared by condensing suitable 2-methylpyrimidines and 5-nitrofurfural according to a process which itself is well known. The condensation reaction between 2-methylpyrimidines and 5-nitrofurfural can be easily effected at an elevated temperature in the presence of a condensing agent, such as hydrochloric acid, sulfuric acid, acetic anhydride, zinc chloride and sodium carbonate, if necessary, in an inert solvent, e.g., alcohols, acetic acid or benzene. The 2-[2-(5-nitrofuryl)-vinyl]-4-aminopyrimidines can also be obtained by hydrolyzing 2-[2-(5-nitrofuryl)-vinyl]-4-acylaminopyrimidines, such as 2-[2-(5-nitrofuryl)-vinyl]-4-acetylaminopyrimidine and 2-[2-(5-nitrofuryl-vinyl]-4-propionylaminopyrimidine according to a process which itself is well known. This hydrolysis is easily effected by heating with acids for about one hour. The 2-[2-(5-nitrofuryl)-vinyl]-4-hydroxypyrimidines can also be obtained by hydrolyzing 2-[2-(5-nitrofuryl)-vinyl]-4-aminopyrimidine according to a process which itself is well known. This hydrolysis is easily effected by heating with acids for more than 4 hours.

The following examples are given to illustrate the practice of the present invention, but are not to be construed as limiting.

*Example 1*

14.7 grams of 5-nitrofurfural and 10 grams of 2-methylpyrimidine are dissolved in 20 cc. of acetic anhydride, and the mixture is then heated for 7 hours at 120° C. After cooling, crystals which separate off by adding water to the mixture are filtered and recrystallized from acetonitrile to give 15 grams of 2-[2-(5-nitrofuryl)-vinyl]-pyrimidine, M.P. 216–217° C. (dec.).

*Example 2*

5 grams of 2-methyl-4-acetylaminopyrimidine is added to a solution of 4.66 grams of 5-nitrofurfural in 10 cc. of acetic anhydride, and the mixture is then heated for 4 hours at 120° C. After cooling, crystals which separate off are filtered and recrystallized from acetonitrile to give 4.2 grams of 2-[2-(5-nitrofuryl)-vinyl]-4-acetylaminopyrimidine, M.P. 221–222° C. (dec.).

*Example 3*

7 grams of 2-[2-(5-nitrofuryl)-vinyl]-4-acetylaminopyrimidine are dissolved in 10% ethanolic hydrochloric acid with heating, followed by refluxing for one hour. After evaporating the ethanol, water is added. The mixture is neutralized with sodium bicarbonate and crystals which separate off are recrystallized from acetonitrile to give 5 grams of 2-[2-(5-nitrofuryl)-vinyl]-4-aminopyrimidine, M.P. 252–253° C. (dec.).

*Example 4*

5 grams of 2-[2-(5-nitrofuryl)-vinyl]-4-aminopyrimidine are dissolved in 50 cc. of 20% hydrochloric acid, followed by heating for 4 hours. After evaporating the solvent under reduced pressure, water is added to the residue. The mixture is basified with sodium bicarbonate and crystals which separate off are recrystallized from dilute acetonitrile to give 3 grams of 2-[2-(5-nitrofuryl)-vinyl]-4-hydroxypyrimidine, M.P. 265° C. (dec.).

*Example 5*

7.1 grams of 5-nitrofurfural and 5.5 grams of 2-methyl-4-hydroxypyrimidine in 15.3 cc. of acetic anhydride are reacted by heating for 3 hours at 120–130° C. After cooling, ether is added to the mixture. Crystals which separate off are filtered and recrystallized from dilute acetone to give 9.1 grams of 2-[2-(5-nitrofuryl)-vinyl]-4-hydroxypyrimidine, M.P. 265° C. (dec.).

*Example 6*

4.1 grams of 5-nitrofurfural and 3.1 grams of 2-methyl-4-methoxypyrimidine in 8.8 cc. of acetic anhydride are reacted by heating for 7 hours at 120–130° C. After cooling, crystals which separate off by diluting with water to the mixture are filtered and recrystallized from acetonitrile to give 5.2 grams of 2-[2-(5-nitrofuryl)-vinyl]-4-methoxypyrimidine, M.P. 138–140° C.

*Example 7*

1.54 grams of 5-nitrofurfural and 1.5 grams of 2-methyl-6-dimethylaminopyrimidine in 3.1 cc. of acetic anhydride are reacted by heating for one hour at 110° C. Water is added to the mixture and extraction is effected with hot acetone. After evaporating the acetone, the residue is recrystallized from acetonitrile to give 1.4 grams of 2-[2-(5 - nitrofuryl) - vinyl]-4-dimethylaminopyrimidine, M.P. 206–207° C. (dec.).

What is claimed is:
1. A compound of the following formula

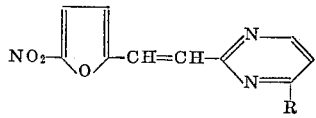

in which R is a member selected from the group consisting of hydrogen, hydroxyl, alkoxyls having 1 to 3 carbon atoms, amino, monoalkylaminos having 1 to 3 carbon atoms, dialkylaminos having 2 to 4 carbon atoms, acetylamino and propionylamino.

2. A compound of the following formula

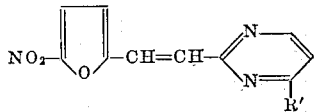

in which R' is a member selected from the group consisting of hydrogen, hydroxyl, methoxy, amino, methylamino, dimethylamino and acetylamino.

3. 2-[2-(5-nitrofuryl)-vinyl]-4-aminopyrimidine.
4. 2-[2-(5-nitrofuryl)-vinyl]-4-hydroxypyrimidine.
5. 2-[2-(5-nitrofuryl)-vinyl]-4-methoxy-pyrimidine.
6. 2-[2-(5-nitrofuryl)-vinyl]-4-dimethyl amino pyrimidine.
7. 2-[2-(5-nitrofuryl)-vinyl]-4-acetylamino pyrimidine.

References Cited
FOREIGN PATENTS
613,604   8/1962   Belgium.
630,163   9/1963   Belgium.

OTHER REFERENCES
Brown, "The Pyrimidines," pages 125–126, Interscience Publishers, Inc., New York, (1962).
Takahashi et al., J. Pharm. Soc. Japan, vol. 72, pages 463 to 471 (1952).

JOHN D. RANDOLPH, *Primary Examiner.*